United States Patent
Nunn

(10) Patent No.: US 7,550,401 B2
(45) Date of Patent: Jun. 23, 2009

(54) METHOD OF MAKING LIGHTWEIGHT HIGH PERFORMANCE CERAMIC MATERIAL

(75) Inventor: Stephen D. Nunn, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 12/174,969

(22) Filed: Jul. 17, 2008

(65) Prior Publication Data

US 2008/0296798 A1 Dec. 4, 2008

Related U.S. Application Data

(62) Division of application No. 11/466,491, filed on Aug. 23, 2006, now Pat. No. 7,419,925.

(51) Int. Cl.
*C04B 35/563* (2006.01)
*C04B 35/58* (2006.01)

(52) U.S. Cl. .................. 501/87; 501/96.3; 89/36.02

(58) Field of Classification Search .................. 501/87, 501/96.3; 89/36.02
See application file for complete search history.

(56) References Cited

U.S. PATENT DOCUMENTS

| | | |
|---|---|---|
| 2,613,154 A | 10/1952 | Montgomery |
| 4,097,293 A | 6/1978 | Komeya et al. |
| 4,195,066 A | 3/1980 | Schwetz et al. |
| 5,156,804 A | 10/1992 | Halverson et al. |
| 5,273,709 A | 12/1993 | Halverson et al. |
| 5,330,942 A | 7/1994 | Holcombe et al. |
| 5,418,196 A | 5/1995 | Niihara |
| 5,505,899 A | 4/1996 | Sigl et al. |
| 5,590,393 A | 12/1996 | Decroix et al. |
| 5,637,269 A | 6/1997 | Niihara |
| 5,720,910 A | 2/1998 | Vlajic et al. |
| 7,309,672 B2 | 12/2007 | Mikijelj et al. |

FOREIGN PATENT DOCUMENTS

CN 1438201 5/2003

OTHER PUBLICATIONS

F. Thevenot, "Sintering of Boron Carbide and Boron Cardbide-Silicon Carbide Two-Phase Materials and Their Properties," Journal of Nuclear Materials, 1988, p. 154-162, vol. 152, No. 2-3.
Chae Hyun Lee and Chong Hee Kim, "Pressureless Sintering and Related Reaction Phenomena of Al2O3-doped B4C," Journal of Materials Science, 1992, p. 6335-6340, vol. 27.
G.I. Kalandadze, et al., "Sintering of Boron and Boron Carbide," Journal of Solid State Chemistry, 2000, p. 194-198, vol. 154.
Klotz, et al., "Characterization of Boron Carbide Consolidation by the Plasma Pressure Compaction (P2C) Method in Air," Ceramic Engineering and Science Proceedings, 2001, p. 27-34, vol. 22, No. 4.
A.A. Shul'Zhenko, et al., "Formation of Polycrystalline Boron Carbide B4C with Elevated Fracture Toughness," Powder Metallurgy and metal Ceramics, 2005, p. 75-83, vol. 44, Nos. 1-2.

*Primary Examiner*—Karl E Group
(74) *Attorney, Agent, or Firm*—Joseph A. Marasco

(57) ABSTRACT

A method of making a sintered ceramic composition includes the steps of: providing a powder that includes at least 50 wt. % boron carbide and 0.05 wt. % to 30 wt. % of at least one oxide selected from oxides of Y, La, Ce, Pr, Nd, Sm, Eu, Gd, Tb, Dy Ho, Er, Tm, Yb, and Lu; milling the powder to form a milled powder; drying the milled powder to form a milled, dried powder; and consolidating the milled, dried powder at a temperature in the range of 1500° C. to 2200° C. to form a sintered ceramic composition having a density of at least 90% of theoretical density, the sintered ceramic composition including zirconium diboride in an amount in the range of 1 wt. % to 10 wt. %.

16 Claims, No Drawings

METHOD OF MAKING LIGHTWEIGHT HIGH PERFORMANCE CERAMIC MATERIAL

CROSS-REFERENCE TO RELATED APPLICATIONS

This application is a divisional application of U.S. patent application Ser. No. 11/466,491 filed on Aug. 23, 2006, now U.S. Pat. No. 7,419,925 entitled "Lightweight High Performance Ceramic Material", the entire disclosure of which is incorporated herein by reference.

STATEMENT REGARDING FEDERALLY SPONSORED RESEARCH

The United States Government has rights in this invention pursuant to contract no. DE-AC05-00OR22725 between the United States Department of Energy and UT-Battelle, LLC.

BACKGROUND OF THE INVENTION

One of the most desirable characteristics of ballistic armor is having the lowest possible weight of armor material to provide the required protection against the maximum expected threat level. For vehicles and aircraft, reduced armor weight means extended range, increased payload, lower fuel consumption, and reduced maintenance costs. For personnel, lower armor weight means reduced fatigue and increased comfort, which translates to improved performance.

Nonoxide armor ceramics that are currently being manufactured, such as boron carbide, silicon carbide, and silicon nitride, are difficult to density to high density to form a useful material. Typically, very high temperatures and applied pressure are required to consolidate these materials and, even under these conditions, it is often necessary to add chemicals to the ceramic composition to aid in densification.

The lowest weight armor ceramic is boron carbide ($B_4C$). Most composition and processing methods used to produce commercially available boron carbide armor tiles are proprietary and, therefore, not available for comparison.

Examples of methods for densifying boron carbide are given in U.S. Pat. No. 4,195,066 which describes the introduction of carbon additives for pressureless sintering of boron carbide. From 0.5 to 10% by weight amorphous carbon is added to promote sintering of boron carbide powder having a particle size $\leq 1$ μm. Typically, for most ceramic materials, a fine powder particle size enhances consolidation and sintered density.

Thevenot, in "Sintering of boron carbide and boron carbide-silicon carbide two-phase materials and their properties," *Journal of Nuclear Materials*, v 152, n 2-3, May 1988, p 154-62, discloses the use of polymeric precursor additions, e.g. polycarbosilane plus phenolic resin, to obtain boron carbide ceramics with a density>92% and containing approximately 5% silicon carbide by weight.

The use of alumina as a sintering aid is described by Lee in "Pressureless sintering and related reaction phenomena of $Al_2O_3$-doped $B_4C$," *Journal of Materials Science*, v 27, n 23, 1 Dec. 1992, p 6335-40. Boron carbide containing 3% alumina by weight is sintered to 96% of theoretical density at 2150° C.

Addition of silicon carbide and/or titanium carbide to boron carbide powder is described in U.S. Pat. Nos. 5,418,196 and 5,637,269 to aid in the sintering of a boron carbide body by hot pressing at up to 2300° C.

U.S. Pat. No. 5,505,899 teaches the addition of one or more metal monocarbides of the elements Ti, Zr, Hf, V, Nb, and Ta in an amount corresponding to from 2 to 6% by weight free carbon to a boron carbide composition to promote sintering at from 2100° C. to 2250° C.

U.S. Pat. No. 5,720,910 describes the use of titania and carbon additions to boron carbide powder to enhance densification at from 1900° C. to 2100° C.

In addition to sintering methods which require the use of additives that are incorporated in the boron carbide starting powder, other approaches for achieving dense boron carbide bodies entail the use of alternative processing means.

Kalandadze, et al. in "Sintering of boron and boron carbide," *Journal of Solid State Chemistry*, v 154, n 1, October 2000, p 194-8, describe the use of explosive compression of powder compacts of boron and boron carbide to increase sintered density.

The use of a processing method called "plasma pressure compaction" is evaluated by Klotz, et al. in "Characterization of boron carbide consolidation by the plasma pressure compaction ($P^2C$) method in air," *Ceramic Engineering and Science Proceedings*, v 22, n 4, 2001, p27-34, where the boron carbide powder is subjected to a pulsed DC voltage followed by an applied uniaxial pressure and high-current, continuous DC voltage to density the material.

Shul'Zhenko, et al. describes an ultra-high pressure boron carbide consolidation process in "Formation of polycrystalline boron carbide $B_4C$ with elevated fracture toughness," *Powder Metallurgy and Metal Ceramics*, v 44, n 1-2, January 2005, p 75-83, where the sintering takes place under a pressure of 5.5 GPa (about 798,000 psi) at a processing temperature of 2200 K (about 1927 C).

The composition and processing history of boron carbide ceramics will determine the physical properties of the material, however, the characteristics of a material that will result in superior ballistic impact resistance are not well understood and armor material performance is ultimately rated by field testing against actual ballistic threats.

BRIEF SUMMARY OF THE INVENTION

Accordingly, it is an object of the present invention to provide a boron carbide powder composition which may be readily consolidated to high density by hot pressing or other means and which results in a boron carbide material that shows improved ballistic impact penetration resistance.

Further and other objects of the present invention will become apparent from the description contained herein.

In accordance with one aspect of the present invention, the foregoing and other objects are achieved by a sintered ceramic composition that includes at least 50 wt. % boron carbide and at least 0.01 wt. % of at least one element selected from the group consisting of Y, La, Ce, Pr, Nd, Sm, Eu, Gd, Tb, Dy Ho, Er, Tm, Yb, and Lu, the sintered ceramic composition having a density of at least 90% of theoretical density.

In accordance with another aspect of the present invention, a method of making a sintered ceramic composition includes the steps of: providing a powder that includes at least 50 wt. % boron carbide and 0.05 wt. % to 30 wt. % of at least one oxide selected from oxides of Y, La, Ce, Pr, Nd, Sm, Eu, Gd, Tb, Dy Ho, Er, Tm, Yb, and Lu; milling the powder to form a milled powder; drying the milled powder to form a milled, dried powder; and consolidating the milled, dried powder at a temperature in the range of 1500° C. to 2200° C. to form a sintered ceramic composition having a density of at least 90% of theoretical density, the sintered ceramic composition including zirconium diboride in an amount in the range of 1 wt. % to 10 wt. %.

For a better understanding of the present invention, together with other and further objects, advantages and capabilities thereof, reference is made to the following disclosure and appended claims.

DETAILED DESCRIPTION OF THE INVENTION

The present invention relates to a boron carbide ceramic material useful for ballistic armor applications and especially to improvements in its ballistic impact penetration resistance, and a method of consolidating this material to high density.

This ceramic material may also be useful as an abrasive material, a wear- and abrasion-resistant material, a high-temperature material, a neutron absorbing material, an energy-related material or the like.

The densification of $B_4C$ usually requires temperatures of about 2100° C. with the addition of carbon or other additives to the $B_4C$ powder to promote densification. The present invention reveals that the addition of relatively minor amounts of certain common chemicals can facilitate the densification of $B_4C$ at a temperature of about 1900° C.

Fabrication of a new and improved boron carbide ceramic in accordance with the present invention generally includes the following steps:
  a. Blending boron carbide ($B_4C$) powder with specific additives as described hereinbelow;
  b. Milling the blended powder;
  c. Drying the milled powder;
  d. Consolidating the milled powder in a high-temperature die to form a sintered, high density, solid ceramic material.

Starting materials begin with $B_4C$ powder in the amount of at least 50% of the blended powder. The $B_4C$ powder should be characterized by an average particle size in the range of 0.10 μm to 15 μm, preferably in the range of 1 μm to 10 μm, more preferably in the range of 2 μm to 7 μm. Additives should have an average particle size in the range of 0.02 μm to 5 μm, preferably in the range of 0.1 μm to 5 μm more preferably in the range of 0.5 μm to 3 μm.

A critical additive is a rare-earth oxide powder, which, for the purpose of describing the present invention, includes an oxide of at least one of the following elements: Y, La, Ce, Pr, Nd, Sm, Eu, Gd, Tb, Dy Ho, Er, Tm, Yb, and Lu. The rare-earth oxide must be added in an amount, in terms of weight % (wt. %) of the blended powder, in the range of 0.05% to 30%, preferably in the range of 0.1% to 20%, more preferably in the range of 0.5% to 10% most preferably in the range of 1% to 5%.

Optional additives include elemental B and C; oxides of the elements Li, Mg, Al, Si, Ca, Sc, Sr; and oxides, carbides, nitrides, and borides of the elements Ti, V, Zr, Nb, Mo, Hf, Ta, and W. Optional additives can be added in an amount, in terms of wt. % of the blended powder, in the range of 0.05% to 30%, preferably in the range of 0.1% to 20%, more preferably in the range of 0.5% to 10% most preferably in the range of 1% to 5%.

Milling fluid can include any known milling fluid. Suggested milling fluids include isopropanol, ethanol, acetone, xylene, naphthalene, and water, and mixtures of the foregoing. Dry milling is also contemplated to be feasible.

Milling media can include any known milling media. Suggested milling media include alumina, aluminum nitride, silicon carbide, silicon nitride, tungsten carbide, titanium carbide, titanium diboride, zirconia, zirconium carbide, zirconium diboride, and mixtures of the foregoing. Milling media tend to wear during milling and may "contaminate" the product. Such "contamination" may or may not be deleterious to the functionality of the product, and may even be beneficial, as noted hereinbelow in the discussion of examples.

The skilled artisan will recognize that conventional drying times and temperature ranges can be used for the wet milled powder.

For consolidation and sintering of the milled powder, high-temperature die material is preferred, such as graphite, optionally with a BN coating and/or carbon paper lining.

Uniaxial hot pressing can be carried out under the following parameters:
  a. Temperature should be in the range of 1500° C. to 2200° C., preferably in the range of 1600° C. to 2100° C., more preferably in the range of 1800° C. to 2000° C., most preferably in the range of 1850° C. to 1950° C.
  b. Time should be in the range of 0.1 hr to 10 hr, preferably in the range of 0.3 hr to 5 hr, more preferably in the range of 0.5 hr to 1 hr.
  c. Pressure should be in the range of 15 psi to 20,000 psi, preferably in the range of 500 psi to 10,000 psi, more preferably in the range of 1,000 psi to 7,000 psi, most preferably in the range of 2,000 psi to 5,000 psi.
  d. Atmosphere should be inert or mildly reducing. Suggested atmospheres include, but are not limited to one or more of: vacuum, nitrogen, and a noble gas. A small amount of hydrogen (for example, >0-20%, preferably 2-4%) may be included with an inert gas.

The densified product is unexpectedly characterized by a density in the range of 90-100% theoretical density; preferably in the range of 95-100% theoretical density; more preferably in the range of 98-100% theoretical density; most preferably in the range of 99.5-100% theoretical density. As can be seen in the examples below, 100% theoretical density has been achieved in the present invention.

Another important identifying characteristic of the densified product in accordance with the present invention is the composition. Firstly, $B_4C$ must be the major constituent of the densified product—there must be more $B_4C$ present than any other constituent. Moreover, the densified product must include a more than trace or contaminant amount of at least one rare-earth element as described herein above—in terms of wt. % of the densified product, at least 0.04%, preferably at least 0.1%, more preferably at least 1%. The maximum amount is contemplated to be about 27 wt. %.

Any or all of the optional elements listed hereinabove (Li, Mg, Al, Si, Ca, Sc, Sr, Ti, V, Zr, Nb, Mo, Hf, Ta, and W) may be present in the densified product in amount(s) of—in terms of wt. % of the densified product, at least 0.04%, preferably at least 0.1%, more preferably at least 1%. The maximum amount is contemplated to be about 27 wt. %.

The effectiveness of the additives for increasing the sintered density of boron carbide compacts and the superior performance of the resulting material for ballistic impact protection is illustrated by the comparisons presented in the following examples:

EXAMPLE 1

Boron carbide powder was milled in isopropyl alcohol containing zirconia milling media. The milled powder was dried and a portion of the powder was poured into a graphite die where it was hot pressed at 2100° C. for 5 hours while being uniaxially pressed at 4000 psi in an argon atmosphere. The resulting boron carbide compact had a sintered density which was 98% of the theoretical density of boron carbide.

EXAMPLE 2

Boron carbide powder containing 2 wt. % alumina and 2 wt. % yttria by weight was milled and blended in isopropyl alcohol containing zirconia milling media. The milled powder was dried and a portion of the powder blend was poured into a graphite die where it was hot pressed at 1900° C. for 1 hour while being uniaxially pressed at 4000 psi in an argon atmosphere. The resulting boron carbide compact prepared with the additives had a sintered density that was 100% of the theoretical density for the blended boron carbide composition.

A comparison of Examples 1 and 2 shows the effectiveness of the combined alumina and yttria additives in promoting the densification of the boron carbide material. By using the additives, the hot pressing temperature was reduced by 200° C. and the hot pressing time was lowered from 5 hours to 1 hour while, simultaneously, the sintered density was increased from 98% to 100% of the theoretical density.

EXAMPLE 3

Boron carbide powder containing 10 volume % (vol. %) carbon micro-fibers was milled and blended in isopropyl alcohol containing zirconia milling media. The milled powder was dried and a portion of the powder blend was poured into a graphite die where it was hot pressed at 1900° C. for 1 hour while being uniaxially pressed at 4000 psi in an argon atmosphere. The resulting fiber-reinforced boron carbide composite compact had a sintered density that was 85% of the theoretical density for the composite.

EXAMPLE 4

Boron carbide powder containing 10 vol. % carbon micro-fibers and also containing 2 wt. % alumina and 2 wt. % yttria by weight was milled and blended in isopropyl alcohol containing zirconia milling media. The milled powder was dried and a portion of the powder blend was poured into a graphite die where it was hot pressed at 1900° C. for 1 hour while being uniaxially pressed at 4000 psi in an argon atmosphere. The resulting fiber-reinforced boron carbide composite compact had a sintered density that was 98% of the theoretical density for the composite.

A comparison of Examples 3 and 4 shows the effectiveness of the alumina and yttria additives in promoting the densification of this carbon fiber reinforced boron carbide composite material. By using the additives, the sintered density was increased from 85% to 98% of the theoretical density after the samples were hot pressed under identical conditions of sintering temperature, sintering time, and applied pressure.

EXAMPLE 5

Five series of boron carbide ceramic tile samples were prepared as assemblies for ballistic impact testing. The assemblies consisted of the boron carbide tile with a thin spall cover bonded to one surface of the tile and a thicker backing plate bonded to the second surface of the tile. Both the spall cover and backing plate were made of the same high tensile strength synthetic fiber material and were the same thickness on all of the armor tile assemblies. The five series of samples included:

Series 1—Armor tile assemblies made with boron carbide ceramic tiles manufactured by commercial supplier 1.

Series 2—Armor tile assemblies made with boron carbide ceramic tiles manufactured by commercial supplier 2.

Series 3—Armor tile assemblies made with boron carbide composite ceramic tiles fabricated as described in Example 4, where the starting boron carbide powder had an average particle size of 1.1 μm.

Series 4—Armor tile assemblies made with boron carbide ceramic tiles containing additives and fabricated as described in Example 2, where the starting boron carbide powder had an average particle size of 1.1 μm.

Series 5—Armor tile assemblies made with boron carbide ceramic tiles containing additives and fabricated as described in Example 2, where the starting boron carbide powder had an average particle size of 4.8 μm.

All of the tiles were tested under the same conditions to measure the ballistic impact penetration resistance when shot with a 7.62 mm rifle bullet. The results of the ballistics tests are summarized in Table 1. The table lists the Test Sample series, indicating the source of the boron carbide tile in the armor tile assemblies; the corresponding average armor tile assembly Areal Density in pounds/square foot, which is the calculated weight of the armor tile assembly needed to cover one square foot of protected area; the Ballistic $V_{50}$ in feet/second, where $V_{50}$ is determined after a number of ballistic impact tests as the projectile velocity at which the impact will result in complete penetration 50% of the time and partial penetration (meaning that the projectile is trapped within the armor assembly) 50% of the time; and the $V_{50}$ Increase in percent over the baseline value. For comparison purposes, the armor tile assemblies made with boron carbide tiles manufactured by commercial supplier 1 (Series 1) were chosen as the baseline series.

TABLE 1

| Ballistic impact tests versus a 7.62 mm rifle projectile | | | |
|---|---|---|---|
| Test Sample | Areal Density, psf | Ballistic $V_{50}$, fps | $V_{50}$ Increase |
| Series 1 (baseline) | 5.26 | 2050 | — |
| Series 2 | 5.20 | 2290 | 11.7% |
| Series 3 | 5.29 | 2048 | 0% |
| Series 4 | 5.20 | 2250 | 9.8% |
| Series 5 | 4.96 | 2547 | 24.2% |

Areal density, pounds/square foot - the weight of armor to cover one square foot of protected surface. Various armors may be compared by asking what areal density is needed to defeat a specified threat. (Threat variables will include: size (caliber); impact velocity; and whether the projectile is armor piercing, incendiary, standard ball, etc.)
$V_{50}$, feet/second - for a given threat, the ballistic $V_{50}$ is the velocity of the projectile at which 50% of the impacts are partial penetrations and 50% are complete penetrations.

It is readily apparent from examination of the ballistic impact test results that the armor tile assemblies of Series 5 show superior ballistic impact penetration resistance when compared to the armor tile assemblies of Series 1 and Series 2, which were made with the commercially supplied boron carbide ceramic tiles. The Series 5 boron carbide ceramic, made with the comparatively coarse 4.8 μm average particle size powder and formulated with alumina and yttria additions, showed a significant increase in ballistic impact penetration resistance.

Analysis of the Series 5 boron carbide using X-ray diffraction (XRD) revealed that the ceramic material contained zirconium diboride as a minor phase in the microstructure. The amount of zirconium diboride in the densified ceramic was estimated to be in the range of 2 wt. % and 8 wt. %. The presence of zirconium diboride in the sample can be explained by postulating the introduction of zirconia in the powder material batch due to wear of the zirconia milling media by the very hard and abrasive boron carbide powder. Subsequently, during processing at elevated temperatures, the zirconia wear material may have reacted with a portion of the boron carbide powder to from zirconium diboride, which remained within the sintered compact.

Examining the processing steps that were used in the preparation of the boron carbide ceramic tiles that were used in the fabrication of the Series 5 armor tile assemblies, a number of factors can be identified which may have played a role in the resultant physical properties of the boron carbide ceramic tile. These factors would include:

a. The boron carbide starting powder particle size.
  b. The chemical additives introduced into the boron carbide powder, including material which may have been introduced due to wear of milling media.
  c. The densification processing conditions, including the furnace temperature, the furnace atmosphere, the heating rate, the time that the material was at temperature, and the applied pressure.

Testing of the sintered product of the present invention did not clearly reveal the extent to which any or a combination of the above-described factors may be responsible for the observed improvement in ballistic impact penetration resistance. The unexpectedly superior performance of the Series 5 armor tile assemblies, however, cannot be disputed.

An amount of zirconium diboride in the range of 1 wt. % to 10 wt. % is contemplated to have potential beneficial effect on the densified ceramic. The precise chemical composition of the sintered product of the present invention was not determined as were the importance and/or effects of the inadvertently added zirconium (perhaps not entirely in the form of zirconium diboride).

While there has been shown and described what are at present considered the preferred embodiments of the invention, it will be obvious to those skilled in the art that various changes and modifications can be prepared therein without departing from the scope of the inventions defined by the appended claims.

What is claimed is:

1. A method of making a sintered ceramic composition comprising:
  a. providing a powder comprising at least 50 wt. % boron carbide and 0.05 wt. % to 30 wt. % of at least one oxide selected from the group consisting of oxides of Y, La, Ce, Pr, Nd, Sm, Eu, Gd, Tb, Dy, Ho, Er, Tm, Yb, and Lu;
  b. milling said powder to form a milled powder;
  c. drying said milled powder to form a milled, dried powder; and
  d. consolidating said milled, dried powder at a temperature in the range of 1500° C. to 2200° C. to form a sintered ceramic composition having a density of at least 90% of theoretical density,
  wherein at least one of said providing step and said milling step introduces Zr into said powder so that said sintered ceramic composition comprises zirconium diboride in an amount in the range of 1 wt. % to 10 wt. %.

2. A method of making a sintered ceramic composition in accordance with claim 1 wherein said powder comprises 0.1 wt. % to 20 wt. % of said at least one oxide.

3. A method of making a sintered ceramic composition in accordance with claim 2 wherein said powder comprises 0.5 wt. % to 10 wt. % of said at least one oxide.

4. A method of making a sintered ceramic composition in accordance with claim 3 wherein said powder comprises 1 wt. % to 5 wt. % of said at least one oxide.

5. A method of making a sintered ceramic composition in accordance with claim 1 wherein said powder further comprises 0.05 wt. % to 30 wt. % of at least one material selected from the group consisting of: elemental B and C; oxides of Li, Mg, Al, Si, Ca, Sc, and Sr; and oxides, carbides, nitrides, and borides of Ti, V, Zr, Nb, Mo, Hf, Ta, and W.

6. A method of making a sintered ceramic composition in accordance with claim 5 wherein said powder comprises 0.1 wt. % to 20 wt. % of said at least one material.

7. A method of making a sintered ceramic composition in accordance with claim 6 wherein said powder comprises 0.5 wt. % to 10 wt. % of said at least one material.

8. A method of making a sintered ceramic composition in accordance with claim 7 wherein said powder comprises 1 wt. % to 5 wt. % of said at least one material.

9. A method of making a sintered ceramic composition in accordance with claim 1 wherein said milling step is carried out using a milling medium comprising zirconium.

10. A method of making a sintered ceramic composition in accordance with claim 1 wherein said consolidating step is carried out at a temperature in the range of 1600° C. to 2100° C.

11. A method of making a sintered ceramic composition in accordance with claim 10 wherein said consolidating step is carried out at a temperature in the range of 1800° C. to 2000° C.

12. A method of making a sintered ceramic composition in accordance with claim 11 wherein said consolidating step is carried out at a temperature in the range of 1850° C. to 1950° C.

13. A method of making a sintered ceramic composition in accordance with claim 1 wherein said consolidating step forms a sintered ceramic composition that has a density of at least 95% of theoretical density.

14. A method of making a sintered ceramic composition in accordance with claim 13 wherein said consolidating step forms a sintered ceramic composition that has a density of at least 98% of theoretical density.

15. A method of making a sintered ceramic composition in accordance with claim 14 wherein said consolidating step forms a sintered ceramic composition that has a density of at least 99.5% of theoretical density.

16. A method of making a sintered ceramic composition in accordance with claim 15 wherein said consolidating step forms a sintered ceramic composition that has a density of 100% of theoretical density.

* * * * *